United States Patent [19]

Barrows

[11] Patent Number: 5,515,025
[45] Date of Patent: May 7, 1996

[54] WATER LEVEL SENSOR, TRAILER USING SAME AND METHOD OF USING TRAILER

[75] Inventor: Jon Barrows, Brandon, Vt.

[73] Assignee: Waterbug Systems, Inc., Brandon, Vt.

[21] Appl. No.: 130,877

[22] Filed: Oct. 4, 1993

[51] Int. Cl.⁶ ................................................. G08B 21/00
[52] U.S. Cl. .......................... 340/431; 340/573; 340/604; 73/307; 200/61.04; 200/84 R
[58] Field of Search ........................ 340/431, 573, 340/604, 605, 618, 620, 611, 623, 616, 615, 984; 116/109, 229; 324/716; 361/178; 307/118; 73/305, 307, 308; 200/61.04, 84 R

[56] References Cited

U.S. PATENT DOCUMENTS

| | | | |
|---|---|---|---|
| 2,734,960 | 2/1956 | Reynolds | 340/605 |
| 3,585,582 | 6/1971 | Dove | 340/431 |
| 3,798,401 | 3/1974 | Kochanski et al. | 340/623 |
| 3,890,478 | 6/1975 | Riddel | 340/623 |
| 3,995,251 | 11/1976 | Jones | 340/431 |
| 4,127,031 | 11/1978 | Barnes | 340/984 |
| 4,377,809 | 3/1983 | Lawford | 340/623 |
| 4,510,487 | 4/1985 | Wolfe | 340/573 |
| 4,878,043 | 10/1989 | Heusquin et al. | 340/604 |
| 5,030,152 | 7/1991 | Carr et al. | 340/604 |
| 5,097,250 | 3/1992 | Hernandez | 340/431 |
| 5,210,525 | 5/1993 | Lennon et al. | 340/604 |

Primary Examiner—Brent A. Swarthout
Assistant Examiner—Nina Tong
Attorney, Agent, or Firm—Burns, Doane, Swecker & Mathis

[57] ABSTRACT

A sensor includes a hollow tube having first and second ends; a cap secured at said first end; the second end being substantially open to allow fluid to enter the tube; a floatation element slidably arranged within said tube; an element at the second end for preventing the floatation element from leaving the tube; a contact switch arranged within the tube between the cap and the floatation element; and a fluid exhaust opening provided in the tube adjacent the contact switch. A method of using a boat trailer having a float sensor secured to the boat trailer at a location so that the float sensor activates an indication when the trailer is lowered into a body of water to a predetermined depth, comprises the steps of lowering the trailer into the body of water until the float sensor indicates that the trailer has been lowered to the predetermined depth; and performing at least one of the following two acts: removing a boat from the boat trailer; and securing a boat onto the trailer so that the boat can be removed from the water. The sensor has other applications including a motion or displacement detector for a swimming pool.

17 Claims, 2 Drawing Sheets

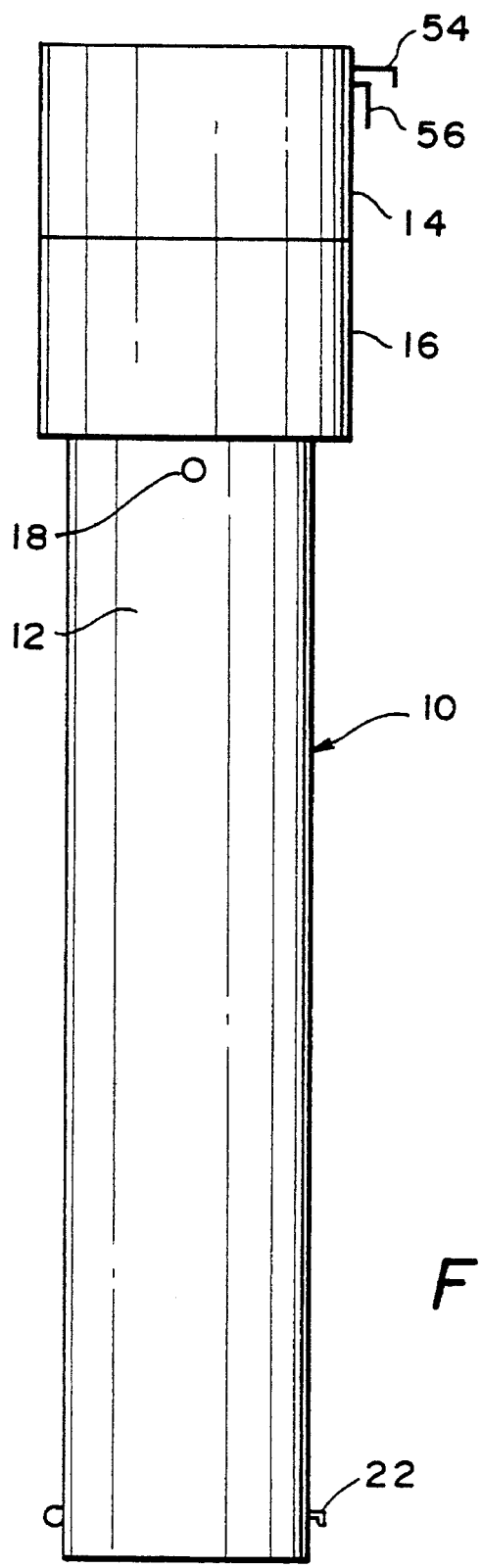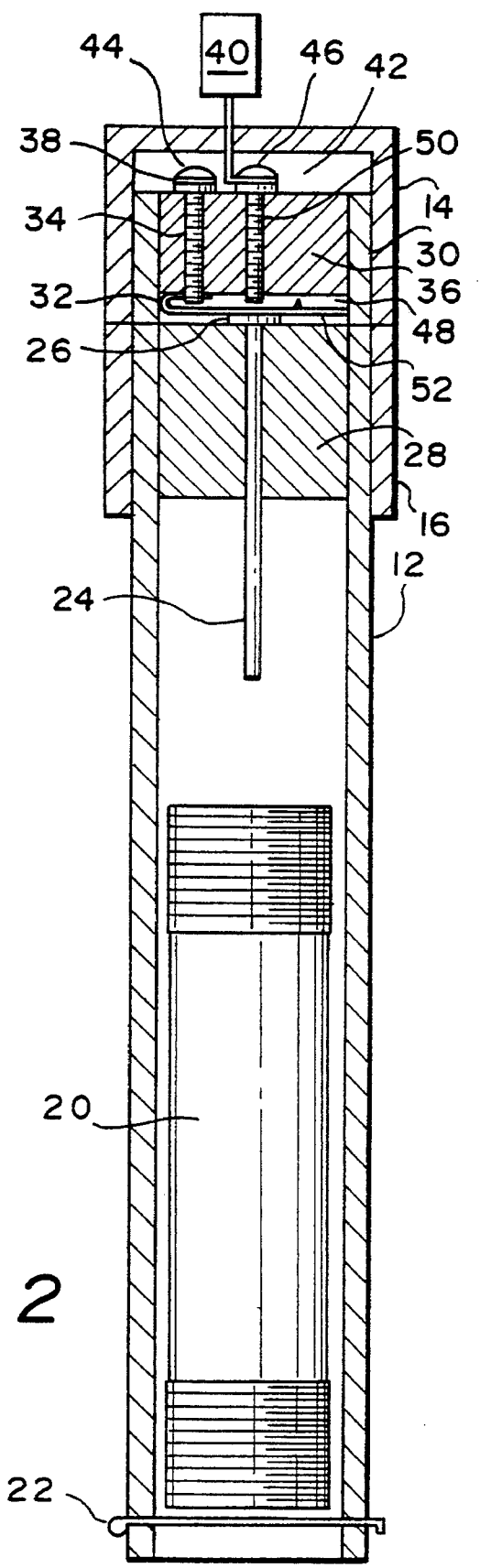

WATER LEVEL SENSOR, TRAILER USING SAME AND METHOD OF USING TRAILER

BACKGROUND OF THE INVENTION

1. Field of the Invention

The present invention relates to a sensor for detecting changes in water levels. The sensor has numerous applications, such as in connection with a boat trailer for determining the proper distance in which to back the trailer into the water prior to launching the boat, or as a sensor for determining motion in a swimming pool, such as that which may be caused by a small child falling into the pool.

2. Discussion of Related Art

Water level sensors have been known in the art for some time. However, the present invention relates to a relatively simple design that can be easily made at a low cost and simply connected to an electrical circuit for providing an appropriate warning signal.

In addition, the present invention is useful for solving problems heretofore experienced in the boat trailer industry. For example, prior to the present invention, when launching a boat, it was difficult to determine how far into the water the trailer should be inserted. If the trailer was not backed into the water far enough, it would be difficult to remove the boat from the trailer. However, if the trailer was backed into the water too far, other problems may result such as premature floating of the boat or problems in removing the trailer out the water.

A similar situation occurs when removing a boat from the water with a trailer. If the trailer is backed into the water too far, it is difficult to center the boat on the trailer to achieve proper seating. On the other hand, if the trailer is not backed into the water far enough, it is difficult to bring the boat far enough up on the trailer to achieve proper seating.

SUMMARY

The present invention solves such problems of the prior art by providing an indication to the driver of a vehicle attached to the trailer when the trailer has been lowered into the water to the proper level.

In addition, the present invention has applications in other areas. The same sensor may be used to detect water motion or the displacement of water in a swimming pool, and thus may be used to signal an alarm when a small child or other object falls into a swimming pool.

In another embodiment of the present invention, the sensor can be used by fishermen or boat owners that enables them to detect the depth of water between high or low tide.

Another example of an embodiment of the present invention is that a night fisherman can attach the sensor to the fishing line. The sensor will activate when fish are running with the line or the fish has been caught. The sensor can be used to activate a light at the end of the fishing pole.

A sensor according to the present invention includes a hollow tube having first and second ends; a cap secured at said first end; said second end being substantially open to allow fluid to enter the tube; a floatation element slidably arranged within said tube; means at said second end for preventing the floatation element from leaving said tube; a contact switch arranged within said tube between said cap and said floatation element; and a fluid exhaust means provided in said tube adjacent said contact switch.

A method according to the present invention of using a boat trailer having a float sensor secured to said boat trailer at a location so that the float sensor activates an indication when said trailer is lowered into a body of water to a predetermined depth, comprises the steps of lowering said trailer into the body of water until the float sensor indicates that the trailer has been lowered to the predetermined depth; and performing at least one of the following two acts:

removing a boat from the boat trailer; and securing a boat onto the trailer so that the boat can be removed from the water.

BRIEF DESCRIPTION OF THE DRAWINGS

FIG. 1 is a view of a water level sensor according to the present invention;

FIG. 2 is a partial cross-sectional view of the sensor of FIG. 1;

DETAILED DESCRIPTION OF PREFERRED EMBODIMENTS

Figure 3:
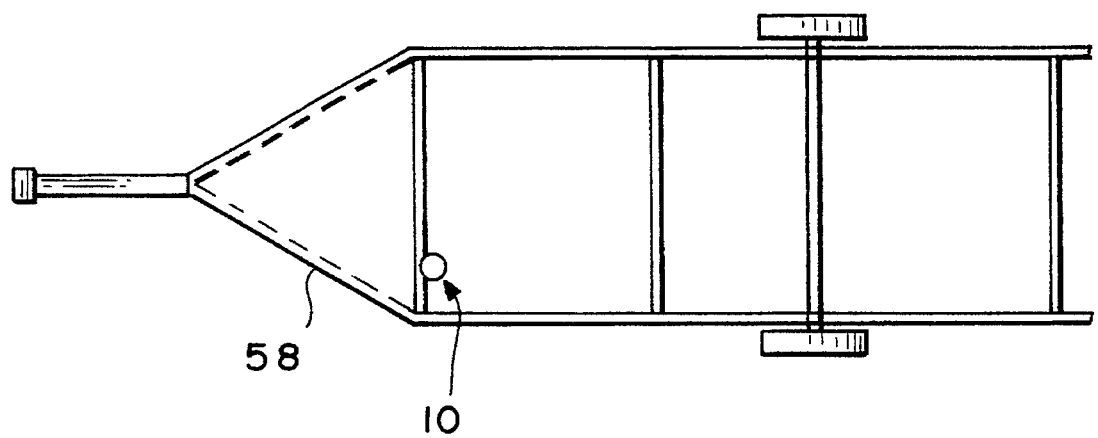
FIG. 3 is a top view of a trailer having the sensor of FIG. 1 attached thereto.
Figure 4:
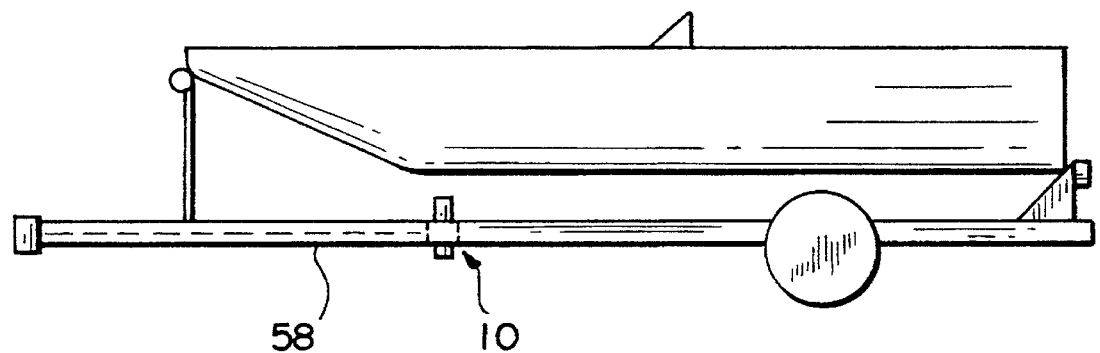
FIG. 4 is a side view of the trailer of FIG. 3.

According to one preferred embodiment of the present invention, a float sensor 10 includes a cylindrical tube 12 having an opened end. At the other end of the tube 12 is a two piece cap 14, 16. A floating element 20 is designed to fit loosely within the tube 12 so that the floating element 20 may move within the tube 12, as necessary, to accommodate changes in water levels. A retaining pin 22 extends through the tube 12 at the open end thereof in order to retain the floating element 20 within the tube 12.

A fluid exhaust means in the form of an opening 18 is provided within the tube 12 at an end of the tube opposite the open end in order to allow air to exit or enter the tube 12 as the floating element 20 moves within the tube 12.

Situated within the tube 12 at the end thereof that is sealed by the cap 14, 16 is a plug 28. The plug 28 has a bore extending axially through the center thereof for slidably guiding the movement of a pin 24. The pin 24 has an enlarged head 26 at one end thereof. The head 26 of the pin 24 prevents the pin from passing completely through the plug 28 into the main portion of the tube 12.

A second plug 36 is also disposed in the end of the tube 12 that is sealed by the cap 14, 16, and defines a chamber 48 between the two plugs 28, 36. The plug 36 includes two bores for retaining bolts 34, 50, respectively.

The head of the first bolt 34 passes through an opening in a U-shaped metal clip 32 in order to retain the metal clip 32 in the chamber 48. The first bolt 34 is secured at the opposite side of plug 36 by a pair of nuts 38.

The second bolt 50 extending through plug 36 is located such that the head of the bolt 50 is located in alignment with an extended portion of the U-shaped clip 32 so that when the extended portion of the U-shaped clip is depressed it contacts the head of the second bolt 50. When the extended portion of the U-shaped clip 32 contacts the bolt 50, a circuit is completed between the two bolts 34, 50.

Preferably the second bolt 50 is mounted in the center of the plug 36, and is in alignment with the pin 24 that extends through the first plug 28. The second bolt 50 is secured by a pair of nuts 46.

In the space 42 provided at the top of plug 36, wires 54, 56 are respectively secured to the first and second bolts by nuts 44, 46. The wires 54, 56 pass through specially provided openings in the cap 14 in a water tight manner.

The second plug 36 is also fixed within the tube 12 in a water tight manner so that water cannot pass beyond the plug 36 into the space 42 above the plug.

To prevent water from passing beyond the first plug 28 and contacting the U-shaped clip 32, a thin film 52 of water tight material, such as plastic, may be secured within the tube 12 between the head of the pin 24 and the U-shaped clip 32. As a result, any water that passes through the first plug 28 through the central bore therein is prevented from contacting the U-shaped clip 32 and thus possibly corroding the contacts therein.

In this application and drawings, a simple contact switch is disclosed that is both economical and reliable. However, without departing from the teachings of the present invention, numerous other types of switches may be employed.

According to one embodiment of the present invention, the above described sensor 10 can be mounted on a boat trailer 58, as illustrated in FIG. 3. The sensor 10 is mounted at a position on the trailer so that when the trailer has been backed into the water to an optimal depth, water enters through the bottom of the tube 12 and causes the floating element 20 to rise through the tube 12, thus forcing pin 24 to close the contacts.

The wires 54, 56 connected to the contacts and extending from the cap may be connected to a control mechanism 40 that can be used to activate an indicator or an alarm system. The control mechanism 40 can be set so that a short temporary closing of the contacts will enable an indicator to be activated for a predetermined period of time that is greater than the period of time for which the contacts are closed. Such control mechanisms are well known to those of ordinary skill in the art. Accordingly, further details of such control mechanisms are hereby omitted.

The control mechanism 40 can be connected to features already present within the cabin of an automobile, such as the car horn or other illuminatable features so that an indication can be made to the operator. If desired, additional or alternative indicating features such as a dedicated horn or light can be mounted within the car and connected to the control mechanism of the present invention.

The sensor 10 can be designed to operate an indication signal from a portable battery, from a car battery, or from some other power source.

In yet another embodiment of the present invention, the float sensor 10 can be incorporated in a swimming pool as a motion or displacement detector. In this embodiment, the tube 12 is fixed to an edge surface of the pool so that the floating element 20 is close to the plunger 24. If an object or child falls into the pool, creating ripples or waves, or displacing an amount of water, that will raise the floating element 20 into contact with the plunger 24, thus triggering the contacts 32.

To account for variations in the water level in the pool, the tube 12 may be fixed to the edge of the pool in an adjustable manner so that the tube 12 can be raised or lowered to account for variations in water level. Alternatively, the contacts 32 can be mounted within the tube 12 within an adjustable manner so that the contact switch may be raised or lowered within the tube 12.

When in use as a motion or displacement detector in a swimming pool, the sensor 10 may be connected to any type of indication means such as an alarm or light system. In one embodiment, the sensor 10 can be connected to an indication means already in use in the house, such a smoke detector or burglar alarm.

As with the embodiment mounted on a trailer, the sensor 10 may also include a control mechanism so that a brief closing of the contacts will enable an alarm or indication to continue for a period of time longer than the closure of contacts.

In yet another embodiment of the present invention, the sensor can be used in an oceanic body of water to monitor tides and or waves. For example, the sensor 10 can be fastened to a dock, or some other stable structure for monitoring changes in the level of the water. In such an embodiment, the contact switch described above may be replaced with a type of sensor that indicates the relative position of the floating element 20 within the tube 12, rather than just triggering a signal when the floating element 20 reaches a predetermined point.

In yet another embodiment, the sensor 10 may be incorporated with fishing apparatus so that when a fish has been hooked, the tube 12 is pulled down into the water, thus causing the floating element 20 to rise within the tube 12 and close the contacts 32. For example, the sensor 10 may be fastened to a float that is connected to a fishing line.

In yet another embodiment, the sensor 10 can be used within large liquid storage tanks, such as gasoline or oil tanks to monitor the level of the liquid in the tank. In some cases, two sensors 10 may be used. One sensor 10 can be placed at an upper level to indicate when the liquid reaches a maximum or desired level. A second sensor 10 can be placed at a lower level and can be used to indicate when the liquid falls below a certain level, and thus needs refilling.

As should now be clear, the sensor 10 of the present invention is an extremely efficient and versatile device that can be used in a vast number of applications.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A sensor, comprising:

a hollow tube having first and second ends;

a cap secured at said first end;

said second end being substantially open to allow fluid to enter the tube;

a floatation element slidably arranged within said tube;

means at said second end for preventing the floatation element from leaving said tube;

a contact switch arranged within said tube between said cap and said floatation element;

a fluid exhaust means provided in said tube adjacent said contact switch;

a plug arranged within said tube between said fluid exhaust means and said contact switch, said plug including a bore extending axially through said plug;

said plug defining a chamber in said tube between said plug and said cap;

a plunger having a head at one end thereof and a stem at a second end thereof, said plunger extending through said bore so that the head of the plunger is in the chamber and the stem of the plunger extends from the plug away from said chamber;

said contact switch being mounted within said chamber in alignment with the head of said plunger so that when said floatation element floats toward said first end of said tube, said floatation element engages said plunger stem causing said plunger to trip said contact switch.

2. The sensor of claim 1, further comprising:

a watertight seal arranged between said plunger and said contact switch.

3. A boat trailer, comprising:

a portable frame for supporting a boat; and a sensor according to claim 1 secured to said boat trailer at a location so that the sensor activates an indication when said boat trailer is lowered into a body of water to a predetermined depth.

4. The boat trailer of claim 3, wherein said indication is arranged in a cabin of a vehicle connected to said boat trailer; and further comprising means connecting said float sensor to said indication.

5. A method of using a boat trailer having a sensor according to claim 1 secured to said boat trailer at a location so that the sensor activates an indication when said trailer is lowered into a body of water to a predetermined depth, comprising the steps of:

lowering said trailer into the body of water until the sensor indicates that the trailer has been lowered to the predetermined depth; and after lowering the trailer to the predetermined depth performing at least one of the following two acts:
removing a boat on the boat trailer from the boat trailer; and
securing a boat on the water onto the trailer so that the boat on the water can be removed from the water.

6. The method of claim 5, wherein said lowering step includes using a vehicle connected to said trailer to lower said trailer into the water.

7. The method of claim 6, wherein the indication is an indicator in the vehicle of the trailer which indicates when the trailer has been lowered to the predetermined depth.

8. The sensor of claim 1, wherein said contact switch includes first and second contacts and said first contact includes a U-shaped metal clip having an extended portion that is deflectable by said plunger to make contact with the second contact.

9. The sensor of claim 8, wherein said plunger head has a surface area that is smaller than a surface area of said plug.

10. The sensor of claim 1, wherein said plunger head has a surface area that is smaller than a surface area of said plug.

11. The sensor of claim 1, wherein the contact switch is deflectable and the fluid exhaust means is an air exhaust means.

12. A sensor, comprising:

a hollow tube having first and second ends;

a cap secured at said first end;

said second end being substantially open to allow fluid to enter the tube;

a floatation element slidably arranged within said tube;

means at said second end for preventing the floatation element from leaving said tube;

first and second contacts arranged within said tube at said first end, wherein said first contact is a deflectable contact of a U-shaped clip comprises two asymmetric legs and said second contact is aligned with an extension of said first contact;

a plunger arranged between said contacts and said floatation element;

said first and second contacts being spaced axially from each other and arranged in alignment with said floatation element so that when said floatation element moves toward said first end, the plunger presses against said first contact and said first contact is depressed against said second contact to complete a circuit therebetween; and a fluid exhaust means provided in said tube adjacent said contact switch.

13. The sensor of claim 12, further comprising:

a watertight seal arranged between said floatation element and said first and second contacts.

14. The sensor of claim 12, wherein said first contact is a U-shaped metal clip having an extended portion that is deflectable by said floatation element.

15. A boat trailer, comprising:

a portable frame for supporting a boat; and a sensor according to claim 12 secured to said boat trailer at a location so that the sensor activates an indication when said boat trailer is lowered into a body of water to a predetermined depth.

16. A method of using a boat trailer having a sensor according to claim 12 secured to said boat trailer at a location so that the sensor activates an indication when said trailer is lowered into a body of water to a predetermined depth, comprising the steps of:

lowering said trailer into the body of water until the sensor indicates that the trailer has been lowered to the predetermined depth; and after lowering the trailer to the predetermined depth performing at least one of the following two acts:
removing a boat on the boat trailer from the boat trailer; and
securing a boat on the water onto the trailer so that the boat on the water can be removed from the water.

17. A boat trailer, comprising:

a portable frame for supporting a boat; and a float sensor secured to said boat trailer at a location so that the float sensor activates an indication when said boat trailer is lowered into a body of water to a predetermined depth;

said float sensor comprises:
a hollow tube having first and second ends;
a cap secured at said first end;
said second end being substantially open to allow fluid to enter the tube;
a floatation element slidably arranged within said tube;
means at said second end for preventing the floatation element from leaving said tube;
a contact switch arranged within said tube between said cap and said floatation element; and
a fluid exhaust means provided in said tube adjacent said contact switch;
a plug arranged within said tube between said fluid exhaust means and said contact switch, said plug including a bore extending axially through said plug;

said plug defining a chamber in said tube between said plug and said cap;

a plunger having a head at one end thereof and a stem at a second end thereof, said plunger extending through said bore so that the head of the plunger is in the chamber and the stem of the plunger extends from the plug away from said chamber;

said contact switch being mounted within said chamber in alignment with the head of said plunger so that when said floatation element floats toward said first end of said tube, said floatation element engages said plunger stem causing said plunger to trip said contact switch.

* * * * *